(12) United States Patent
Ameti et al.

(10) Patent No.: US 12,518,095 B1
(45) Date of Patent: Jan. 6, 2026

(54) DYNAMIC ENTITY CATALOG UPDATE FOR NATURAL LANGUAGE PROCESSING

(71) Applicant: Amazon Technologies, Inc., Seattle, WA (US)

(72) Inventors: Santosh Kumar Ameti, Bellevue, WA (US); Mani Kumar Adari, Redmond, WA (US); Vinod Kumar Jagannathan, Sammamish, WA (US); Subhojit Das, Bellevue, WA (US); Harshal Pimpalkhute, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 542 days.

(21) Appl. No.: 17/810,333

(22) Filed: Jun. 30, 2022

(51) Int. Cl.
| | |
|---|---|
| *G06F 40/279* | (2020.01) |
| *G06F 40/35* | (2020.01) |
| *G06F 40/40* | (2020.01) |
| *G10L 15/06* | (2013.01) |
| *G10L 15/22* | (2006.01) |
| *G10L 15/26* | (2006.01) |

(52) U.S. Cl.
CPC .......... *G06F 40/279* (2020.01); *G06F 40/35* (2020.01); *G06F 40/40* (2020.01); *G10L 15/063* (2013.01); *G10L 15/22* (2013.01); *G10L 15/26* (2013.01); *G10L 2015/0635* (2013.01)

(58) Field of Classification Search
CPC ............ G10L 15/22; G10L 15/0635; G10L 2015/223; G10L 15/1815; G10L 15/1822; G10L 13/00; G10L 15/063; G10L 15/26; G10L 15/30; G10L 2015/228; G10L 15/18; G10L 13/02; G10L 15/02; G10L 15/08; G10L 15/183; G10L 15/19; G10L 2015/088; G06F 3/167; G06F 40/30; G06F 40/35; G06F 16/3329; G06F 16/36; G06F 40/279; G06F 40/295; G06F 40/47; G06F 40/58; G06F 40/40
See application file for complete search history.

(56) References Cited

U.S. PATENT DOCUMENTS

| | | | |
|---|---|---|---|
| 9,369,410 | B2 | 6/2016 | Capper et al. |
| 10,817,265 | B2 | 10/2020 | Collins |
| 11,128,579 | B2 | 9/2021 | Magliozzi et al. |
| 11,989,519 | B2 * | 5/2024 | Platt ................. G06F 40/30 |
| 12,050,871 | B2 * | 7/2024 | Dasgupta ............. G06F 40/295 |
| 12,124,804 | B2 * | 10/2024 | Aung ................... G10L 15/197 |
| 12,153,881 | B2 * | 11/2024 | Jalaluddin ............ G06F 40/279 |
| 12,205,585 | B2 * | 1/2025 | Robert Jose ......... G10L 15/063 |
| 2014/0337247 | A1 * | 11/2014 | Stephens ............... G06Q 30/00 |
| | | | 705/343 |

(Continued)

*Primary Examiner* — Abdelali Serrou
(74) *Attorney, Agent, or Firm* — S. Scott Foster; Kowert, Hood, Munyon, Rankin & Goetzel, P.C.

(57) ABSTRACT

A natural language processing system may implement dynamic entity catalog updates. An updated version of an entity catalog describing possible values for entities may be obtained. Respective natural language processing stage artifacts may be generated based on the updated version of the entity catalog for different processing stages of the natural language processing system. The natural language processing stage artifacts may be deployed to the different processing stages of the natural language processing system to replace a prior version of the entity catalog for processing subsequently received input text.

20 Claims, 7 Drawing Sheets

(56) References Cited

U.S. PATENT DOCUMENTS

| | | | |
|---|---|---|---|
| 2016/0188652 A1* | 6/2016 | Goo | G06F 16/113 |
| | | | 707/754 |
| 2018/0174020 A1 | 6/2018 | Wu | |
| 2019/0073197 A1* | 3/2019 | Collins | G06F 8/60 |
| 2019/0158811 A1* | 5/2019 | Van Der Zwan | H04N 23/63 |
| 2023/0046851 A1* | 2/2023 | Ogura | G06F 40/30 |

* cited by examiner

DYNAMIC ENTITY CATALOG UPDATE FOR NATURAL LANGUAGE PROCESSING

BACKGROUND

Over recent years, the number of small-footprint sensor-containing devices such as smart phones, wearable devices, personal assistant devices and various other "Internet of Things" (IoT) devices which can be used for accessing a variety of distributed or remote applications have been increasing dramatically. Many of these devices comprise sensors capable of detecting voiced commands. The small-footprint devices are often designed to communicate with server farms at data centers which can be used to perform application tasks based on the input provided via the devices.

In principle, the proliferation of devices that can collect voice signals increases the number of channels that can be used by vendors to provide various services and applications, thereby potentially increasing revenues for their businesses. Many customers may find it much more appealing or intuitive to, for example, order a meal using voiced commands than to order the meal after filling out a form on a computer screen. Users may typically prefer to use conversational or "natural" language to express their commands or intentions, in a manner similar to the way they would interact with other individuals, rather than being restricted to using specific "canned" phrases in a certain sequence. Applications which are designed to interact conversationally with users may be referred to as dialog-driven applications.

The interpretation of the signals received via the sensor-containing devices is a complex problem, especially in scenarios in which customers are allowed to express themselves informally or conversationally. To interpret arbitrary voice commands, for example, sophisticated automated speech recognition (ASR) algorithms and/or natural language processing (NLP) algorithms may need to be employed. In many cases, in order to fulfill a particular task being requested by a customer, it may not be sufficient to interpret just one set of voiced words; instead, a back-and-forth interaction may be needed to determine various aspects of the user requirements. Different users may have different preferences and behaviors regarding their interactions with a given dialog-driven application. Thus, managing interactions between a dialog-driven application and diverse clients remains a non-trivial technical challenge.

Figure 1:
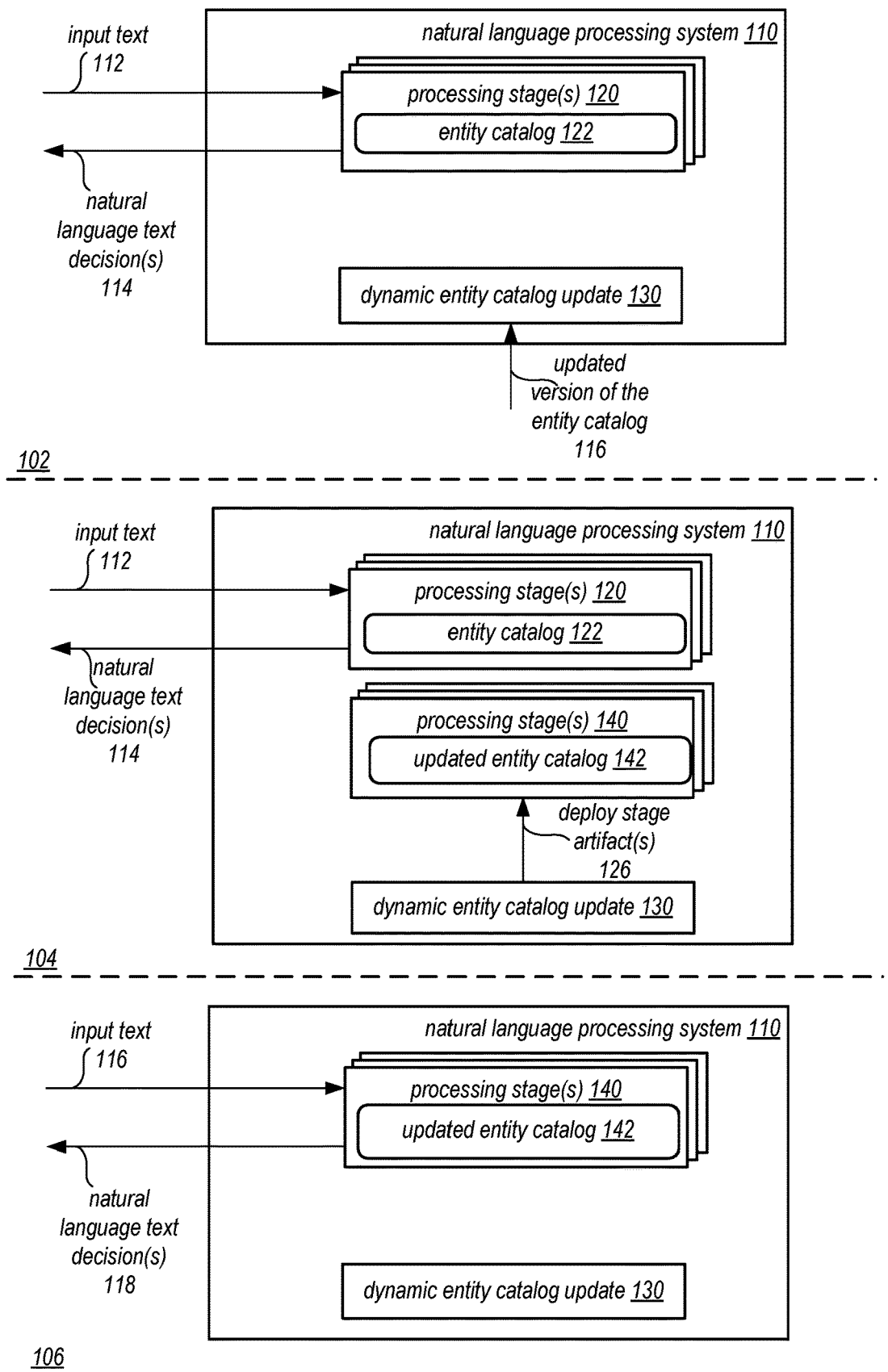
FIG. 1 illustrates a logical block diagram of dynamic entity catalog update for natural language processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic entity catalog update for natural language processing are described herein. Natural language processing systems have many different applications. For example, natural language processing systems may act as an interpretive layer between a user and various different systems, services, or applications which implement special interfaces, controls, protocols, or other interfaces. In this way. natural language (e.g., human language that forms requests, instructions, or other interactions) can be used to interact with these systems, services, or application without using specialized interface knowledge. For example, natural language queries may be used to access or lookup various information, instead of requiring a user to specify the lookup request according to Structured Query Language (SQL) format, or voice commands in natural language may be used to interact with the different systems (e.g., voice commands to operate various devices). This is just one example; many other natural language processing systems may be implemented.

In some embodiments, natural language processing may rely upon information that describes some of the different entities that may be included in the input text. For example, entities may be used to describe different values for parameters of actions invoked by the input text being processed by natural language processing, such as labels for slots as discussed below with regard to FIGS. 4-5, or predicates, filters, or other values that control performance of later processing after natural language processing. In some embodiments, entities may be described and stored in an entity catalog (e.g., a data structure, document, or other collection of entity information). These entity values, and, in some scenarios, relationships between entities, may be stored in the entity catalog.

Entities used for natural language processing may change over time. For example, additional entity values may be added to account for new scenarios, parameters, or other features which may be invoked using the additional entity values. Changes to entity relationships may also occur. For example, see the discussion below with regard to FIG. 5. Instead of re-building natural language processing systems to account for these changes, which may take processing offline, techniques for dynamic entity catalog update for natural language processing may be performed to provide a seamless and transparent transition to a new version of an entity catalog. In this way, little or no down-time may be experienced (e.g., applications can use new information without being rebuilt), increasing the availability of a natural language processing system. Moreover, dynamic updates may account for the changes to entity catalogs, so that these changes are captured and reflected quickly in natural language processing systems. In this way, natural language processing systems can quickly adapt to new information and scenarios.

FIG. 1 illustrates a logical block diagram of dynamic entity catalog update for natural language processing, according to some embodiments. In scene 102, natural language processing system 110 may implement one or more processing stages 120 to perform various processing tasks on input text 112 (which may be provided directly from a user or from another application, such as an automatic speech recognition system) and return natural language text decisions 114 as a result (e.g., an intent with various parameters, a sentiment for various identified entities, etc.). Natural language processing system 110 may be a standalone system, service, or application, or in some embodiments, may be integrated as part of another application or service, such as the applications performing dialog driven actions as discussed in detail below with regard to FIGS. 2-5.

Processing stages 120 may use an entity catalog 122 to perform various processing tasks. For example, tasks to identify values for parameters, such as the slot labeling and/or slot resolution tasks discussed below with regard to FIG. 4, may utilize entity catalog 122 to understand what the supported values of entities are and then apply them to understand and process input text 112.

Dynamic entity catalog update 130 may be implemented to update natural language processing system 110 to utilize an updated version of entity catalog 122. For example, dynamic entity catalog update 130 may obtain the updated version of the entity catalog, as indicated at 116.

As illustrated in scene 104, dynamic entity catalog update 130 may generate and deploy updated stage artifacts 126 for processing stages 140 (which may be the same as processing stages 120 but using the updated entity catalog 142 according to the updated entity catalog 142). Note that natural language processing system 110 may still be serving input text 112 and providing natural language text decisions 114.

As illustrated in scene 106, once deployed, natural language processing system 110 may switch to or utilize processing stages 140 to handle subsequent input text 116 and provide natural language text decisions 118. In this way, the updated entity catalog 142 may be utilized to handle natural language processing without disruption.

Please note that the previous description of dynamic entity catalog update for natural language processing is a logical illustration and thus is not to be construed as limiting as to the implementation of a natural language processing system, or various other illustrated features.

This specification continues with a general description of a provider network that implements multiple different services, including a dialog driven application management service, which may implement dynamic entity catalog update for natural language processing. Then various examples of, including different components/modules, or arrangements of components/module that may be employed as part of implementing the services are discussed. A number of different methods and techniques to implement dynamic entity catalog update for natural language processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
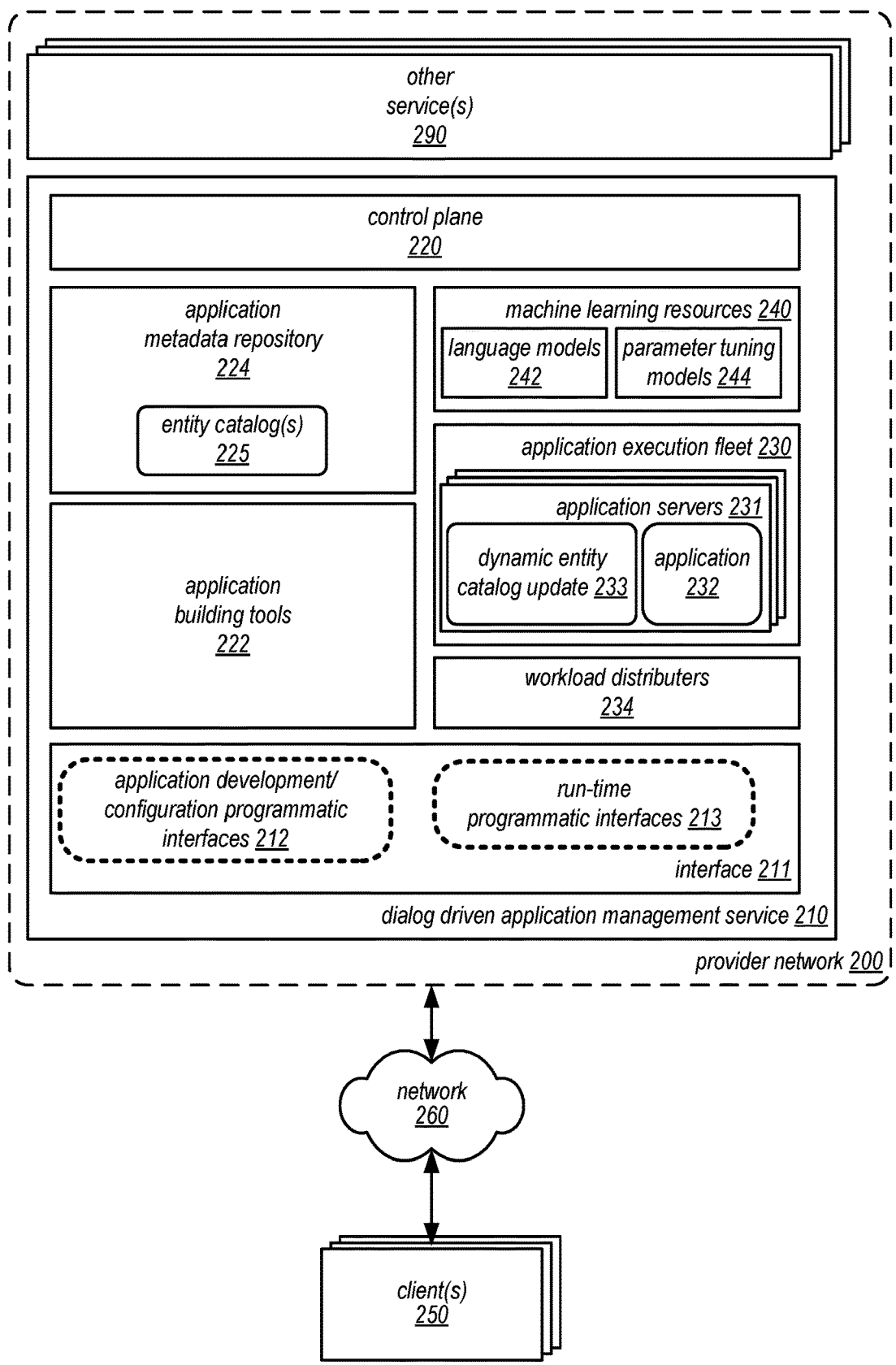
FIG. 2 illustrates an example provider network that may implement a dialog driven application management service that implements dynamic entity catalog update for natural language processing, according to some embodiments.

FIG. 2 illustrates an example provider network that may implement an dialog driven application management service that implements dynamic entity catalog update for natural language processing, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as dialog driven application management service 210, and/or any other type of network-based services 290 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of dialog driven application management service 210 may be implemented by a particular node or may be distributed across several nodes. In some embodiments, a given node may implement the functionality of more than one service system component (e.g., more than one data store component).

Dialog driven application management service 210 may implement interface 211 to allow clients (e.g., client(s) 250 or clients implemented internally within provider network 200, such as a client application hosted on another provider network service like an event driven code execution service or virtual compute service) to interact with dialog driven application management service. Interface 211 may be one or more a graphical user interfaces, programmatic interfaces that implements Application Program Interfaces (APIs) and/or a command line interfaces).

In some embodiments, interface 211 may be broadly classified into application development and configuration programmatic interfaces 212 and run-time programmatic interfaces 213. The application development and configuration programmatic interfaces 212 may be used by application owners and developers to create and provide preferred configuration settings for various dialog-driven applications which are to be executed using the application execution fleet 230, machine learning resources 240, and/or external task fulfillment resources, in various embodiments. Application owners may interact with the dialog driven application management service 210 via the interfaces 212 from a variety of application owner devices (e.g., on clients 250) in different embodiments, such as desktop computers, laptops, mobile devices and the like. Information about the dialog-driven applications, such as logical descriptors of the applications, program code (e.g., in source code or executable form), configuration settings for various stages or interaction categories of the applications, such as entity catalog(s), may be stored in an application metadata repository 224, in at least some embodiments.

End users (also referred to as clients) of dialog driven applications may interact with the applications via run-time programmatic interfaces 213 in the depicted embodiment. For example, the end users may provide input in the form of audio signals, to various sensors at end user devices (e.g., on clients 250). A variety of end user devices may be used to interact with dialog-driven applications in different embodiments, such as phones, tablet computing devices, wearable computing devices such as smart watches, game-playing devices or consoles, automated personal assistant devices, augmented reality devices, virtual reality devices, IoT devices, laptops, other mobile devices, desktops, compute instances of virtualized computing services, and so on. The end user input may be processed initially (e.g., subdivided into smaller units called events or blocks, each comprising a few hundred bytes of data) at dialog driven application management service 210 client-side components at the end user devices, and then representations of the end user-generated input may be transmitted to the dialog driven application management service 210 from the client-side components in the depicted embodiment via run-time programmatic interfaces 213. In some implementations, a client-side component may comprise one or more processes or threads of execution.

Depending on the type of action the end user wishes to perform using the dialog-driven application, several interactions with the dialog driven application management service 210 may be required, e.g., over one or more connections established between a client-side component and one or more application servers 231 in at least some embodiments. A given interaction may, for example, comprise transmission of a set of user-generated input to the application server, analysis of the user-generated initiated by the server (and performed, for example, using language models 242), and a response provided to the end user from the server. In at least some embodiments, one or more resources external to the dialog driven application management service may be used by servers 231 to initiate tasks of a dialog-driven application after a set of parameters for the tasks have been obtained from the user-generated input (e.g., implementing resources in other service(s) 290). Such tasks may include, for example, retrieval of requested bank or credit card information from a source such as a financial organization's database, ordering of an item from a catalog, and so on. External task fulfillment resources utilized by the servers 231 may include, for example, a dynamically-provisioned event driven computing service of provider network 200, other computing or storage services of a cloud computing environment, resources located at data centers of the application owners, and so on. The workload distributors 234, comprising one or more computing devices, may be responsible for selecting the particular server 231 in fleet 230 with which a given client-side component is to be connected, e.g., upon receiving a connection establishment request from the client-side component in various embodiments.

Dialog driven application management service 210 may implement a control plane 220 to perform various control operations to implement the features of dialog driven application management service 210. For example, control plane 220 may monitor the health and performance of requests at different components workload distributers, application servers 231, machine learning resources 240, application building tools 222, and application metadata repository 224 (e.g., the health or performance of various nodes implementing these features of dialog driven application management service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments.

Dialog driven application management service 210 may implement application building tools 222, in some embodiments. In various embodiments, representations or descriptors of dialog-driven applications involving one or more categories of interactions with end users, and actions to be initiated based on analysis of end user-generated inputs, may be obtained at the dialog driven application management service. Such representations may, for example, be generated as a result of the use of one or more easy-to-use application building tools 222 by application owners. The application building tools 222, may, for example, include a multi-step dialog setup coordinator responsible for enabling application developers to specify the steps of the interactions needed to determine parameter values for fulfilling various application intents, as well as a fulfillment integration coordinator responsible for inserting the appropriate hooks for invoking resources for implementing the intents into the dialog-driven application or configuring use of dynamic updates to entity catalogs, as discussed below with regard to FIG. 3. When creating an application using such tools 222, an application owner may indicate the external task fulfillment resources to be used (if any) for the application, such as a particular function to be invoked using a dynamically-provisioned event driven computing service, and this information may be stored as part of the application descriptor or representation. Several types of configuration settings for individual categories of the interactions (or for groups of categories) may also be obtained at the dialog driven application management service 210, e.g., via one or more programmatic interfaces 212 and/or via the tools 222 in at least some embodiments. For example, an application owner may indicate that a first category of interactions of an application is to be implemented in an interruptible mode, while a second category is to be implemented in an uninterruptible mode. In some cases, various timing parameters may be specified to enable dialog driven application management service servers to determine when a particular set of user-generated input is to be considered complete, when to prompt the end user for initial input of an interaction category, and so on.

Dialog driven application management service 210 may implement machine learning resources 240. Machine learning resources 240 may be utilized not just to analyze and interpret user-generated input, but also to automatically tune some or all of the configuration settings chosen for dialog-driven applications. For example, in some embodiments, one or more machine learning-based parameter tuning models 244 may analyze user-generated input and server-generated responses of a particular dialog-driven application, collected (after obtaining the permissions of the end users via an opt-in interface) over some period of time. Such analysis may reveal, for example, statistical distributions of such interaction attributes as the number of times end users tend to interrupt server presentation of output, the durations of initial silences of user utterances, how often end users tend to switch between communication formats such as audio versus text versus dual tone multi frequency (DTMF) for different interaction categories, and so on. Using such data and the parameter tuning models 244, one or more of the configuration settings (e.g., interruptibility settings, timing parameters, etc.) of a data-driven application may be modified in some embodiments. In at least some embodiments, machine learning resources 240 may be used to generate various processing stage artifacts for applications, such as application 232, as discussed in more detail below with regard to FIG. 4.

In various embodiments, dialog driven application management service 210 may implement application execution fleet 230 to host or otherwise implement applications 232 (e.g., built via tools 222 and hosted in dialog driven application management service 210). Dynamic entity catalog update 233 may be invoked, specified, or supplied as a feature built into or utilized by applications 232. As discussed in detail above with regard to FIG. 1 and below with regard to FIGS. 3-6, in some embodiments.

Generally speaking, clients 250 may encompass any type of client that can submit network-based requests to provider network 200 via network 260, including requests for dialog driven application management service 210 (e.g., a request to develop a dialog driven application or a run-time request to establish a dialog communication). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of dialog driven application management service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like dialog driven application management service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
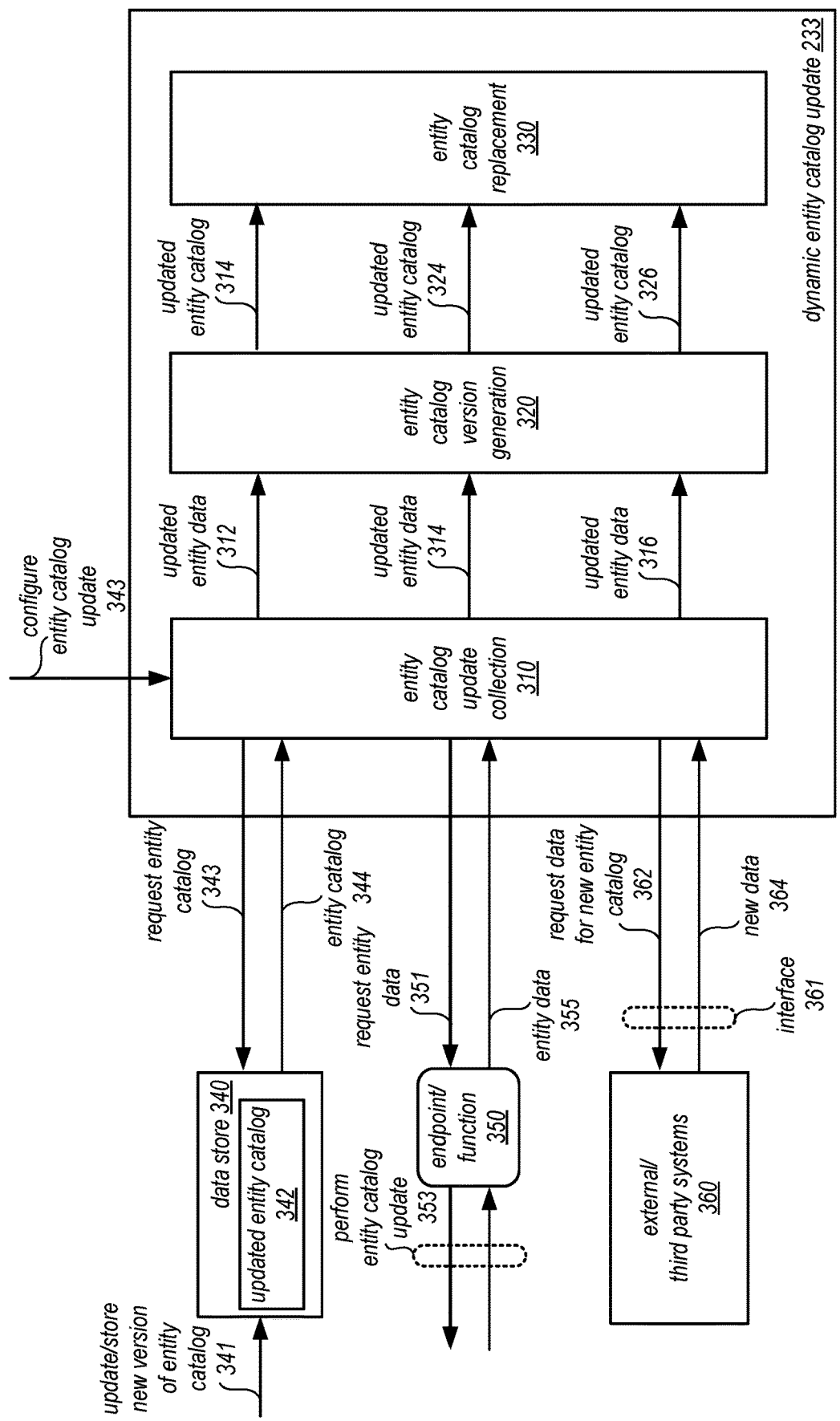
FIG. 3 illustrates a logical block diagram of data collection for collecting data for dynamic entity catalog update, according to some embodiments.

Different sources of entity catalogs (or entity catalog data) may be used in different embodiments and may be supported for dynamic entity catalog update. Thus, collecting entity catalog data for updated versions of entity catalogs may be performed. FIG. 3 illustrates a logical block diagram of data collection for collecting data for dynamic entity catalog update, according to some embodiments.

Dynamic entity catalog update 233 may implement entity catalog update collection 310 to handle automated (and requested) tasks to obtain new entity catalog data. As indicated at 343, a request may be received (e.g., via interface 212 discussed above with regard to FIG. 2) to configure entity catalog update for an application. For example, entity catalog configuration requests 343 may specify features, such as, the period of time between checking for entity catalog updates (or other event triggers for obtaining entity catalog data) and the location, access credentials, or other any other information for identifying, accessing, and/or obtaining new entity catalog data. Entity catalog update collection 310 may then apply or use the specified configuration to performing dynamic entity catalog updates.

For example, in some embodiments, a data store 340 may be used to store entity catalogs, including a new entity catalog. A request to update or store a new version of an entity catalog, as indicated at 341, may be sent to data store 340. This updated entity catalog 342, may then be requested, as indicated at 343 by entity catalog update collection 310 and then returned, as indicated at 344 (e.g., by using a provided location, identifier, access, credentials, and so on after a trigger event specified via configuration request 343).

In another example, an endpoint or function (e.g., a Webhook) 350 may be specified for providing an updated version of an entity catalog, in some embodiments. For example, endpoint or function 350 may be for another service, system, or application (e.g., at a provided network address) that may be sent a request 351 according to a specified API call (or other invocation command), such as in entity catalog update configuration request 343. The system, service, or application that implements the endpoint and function may perform the request for new entity data (or a new entity catalog), as indicated 353 (e.g., at other colocated resources or at other locations) to obtain and/or generate the entity data which may then be returned to entity catalog update collection 310, as indicated at 355.

In another example, an external or third party system 360 may be supported by dynamic entity catalog update 233. Unlike endpoint/function 350, entity catalog update collection 310 may implement a process or workflow to determine which requests may be used to generate and/or otherwise obtain the updated version of the entity catalog from external/third party systems 360. For instance, entity catalog update collection 310 may understand which data structures or features to read (or how to query them) to obtain different, as indicated at 362, in order to obtain new data 364 through interface 361. One example embodiment may be a directory storage system (e.g., for employees, systems, devices, or other hierarchical relationships between different objects represented in the directory storage system). A request to read or obtain new data (e.g., since a last request) may allow for the newly added objects to be obtained and returned to entity catalog update collection 310.

Dynamic entity catalog update 233 may implement entity catalog version generation 320, in some embodiments. An entity catalog may be consumable for updates in a particular format (e.g., a JSON file or other notation format), in some embodiments. Entity catalog version generation 320 may generate an entity catalog document to include both any new entity data (or changes to entity data), such as may be obtained by entity catalog update collection at 312, 314, and 316, as well as changes to entity relationships, as discussed below with regard to FIG. 5. New entity data may also be written to or stored in a catalog, such as in data store 340, by editing (e.g., writing, appending, modifying, etc.) the entity catalog to produce an updated version of the entity catalog.

Figure 4:
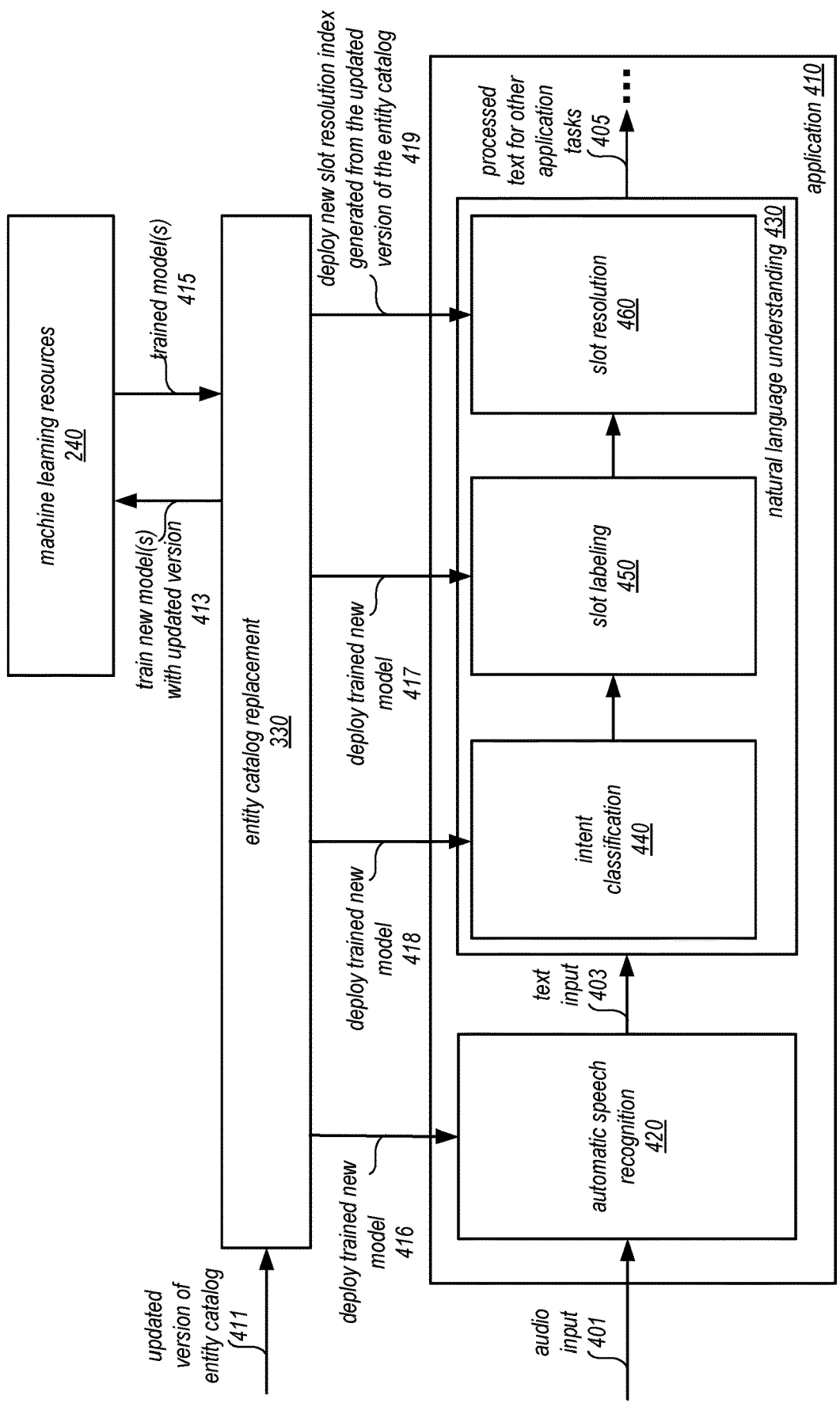
FIG. 4 illustrates a logical block diagram of generating and deploying natural language processing artifacts for dynamic entity catalog update, according to some embodiments.

As indicated at 322, 324, and 326, updated entity catalogs obtained from different sources may be provided to entity catalog replacement 330, which may perform a transparent entity catalog update, in some embodiments. FIG. 4 illustrates a logical block diagram of generating and deploying natural language processing artifacts for dynamic entity catalog update, according to some embodiments.

Application 410 may be similar to application 232 discussed above with regard to FIG. 2. Application 410 may implement a dialog-driven application that utilizes audio input 401 to perform various operations, including responding with further dialog (e.g., as audio dialog or text dialog). In other embodiments, other types of applications 410 may implement similar or different features including natural language understanding processing. As such, the techniques described below with regard to dynamic entity catalog updates may be performed for other applications and thus the following example is not intended to be limiting.

Application 410 may implement automatic speech recognition 420 (sometimes referred to as "ASR"). Automatic speech recognition 420 may, for example, implement various machine learning models trained to recognize human speech in audio input and transcribe that human speech into human language text. Various different kinds of machine learning models, including machine learning models and techniques that utilize finite state transducers (FSTs) which may encode grammar rules or other information used for recognizing speech. The output of automatic speech recognition 420 may be text input 403, which may be provided to natural language understanding 430 for further processing. Natural language understanding 430, as discussed above with regard to FIG. 1, may include multiple different stages, such as intent classification 440, slot labeling 450, and slot resolution 460, in some embodiments. Each of these different stages may be used to provide various information or decisions about text input for other application tasks, as indicated at 405 (e.g., an intent with different labeled slots used to determine responsive actions (e.g., dialog, either audio or text, or perform actions, such as request or instruct various different system operations).

In various embodiments, intent classification 440 may be implemented to understand the intent of text input 403. For example, in some embodiments, intent may be an action to be performed responsive to the text input 403. Actions may correspond to various different operations or tasks, which may include one or more workflows, programs, processes, or other instructions that are executed in order to perform the action corresponding to the determined intent. Intent classification 440 may be implemented using one (or more) trained machine learning models that provide a classification inference given for given input text, such as deep learning models, like Recurrent Neural Network (RNN) based approaches (e.g., gated recurrent unit (GRU) and long short-term memory (LTSM) models), or statistical model-based classification.

In various embodiments, intents may have parameters that configure, instruct, or otherwise inform performance of the corresponding action of the intent. These parameters may be referred to as slots. For example, if an intent recognized is "Order a pizza" then the intent may have slots that correspond to "pizza size" and "delivery type" A label for a slot may provide the value of the parameter for the slot (e.g., "medium pizza" and "pickup"). Thus, natural language understanding 430 may implement different natural language processing stages for slot labeling, such as slot labeling 450 and slot resolution 460. Slot labeling 450 may, similar to intent classification 440, be one or more trained machine learning models for label prediction for slot(s) identified for an intent. For example, slot labeling 450 may utilize FSTs to for label predictions. In some embodiments, these slot label predictions may then be used as input into slot resolution 460 (e.g., a slot label prediction with a highest confidence) to resolve to one of the slots provided in an entity catalog. For example, slot resolution 460 may use an index created from the entity catalog (e.g., a hash index using the different slot label values) to perform a text search for text matching the predicted slot label from the catalog using the hash index.

Entity catalog replacement 330 may perform dynamic update for an updated version of an entity catalog with respect to application 410. For example, an updated version of an entity catalog may be obtained (as discussed above with regard to FIG. 3). Entity catalog 330 may identify the different stages that will be updated, such as slot labeling 450 and slot resolution 460. Entity catalog replacement 330 may implement different techniques for generating new processing stage artifacts based on the updated version of the entity catalog. For example, for slot labeling 450 the trained machine learning model may be updated (e.g., via retraining to use the new entity catalog for slot prediction 450. In this example, machine learning resources 240 (discussed above with regard to FIG. 2) may be used to train a new model(s) with the updated version of the entity catalog, as indicated at 413. In this way, any added, modified or removed labels for slots as well as any added, modified, or removed relationships between entities may be used for predicting slot labels, or other processing tasks, such as intent classification and/or even for non-natural language processing tasks, such as automatic speech recognition 420.

Trained model(s) 415 may be provided and entity catalog replacement 330 may deploy the trained new models 417, 418, and 416.

In another example, entity catalog replacement 330 may generate a new index as the processing stage artifact for the updated version of the entity catalog for slot resolution 460. For instance, an indexing technique, such as generating a hash-based indexing structure for performing exact match or near match text-based searches on the test of predict slot labels with respect to the updated version of the entity catalog may be provided so that the label predictions may be used to search for the label values actually in the entity catalog (which may differ from the predicted value at slot labeling 450). As indicated at 419, the new slot resolution index generated from the updated version of the entity catalog may be deployed for slot resolution 460.

In some embodiments, deployment for new artifacts may be in-place deployment (e.g., storing the new artifact to the host computing resource(s) for application 410. Slot labeling 405 and slot resolution 460 may be restarted and directed to use the new model and new index respectively. In some embodiments, deployment may be to different computing resources to implement another copy of application 410 which will be enabled when deployment is complete, such as by having workload distributers 234 discussed above with regard to FIG. 2 or other request routers, switch to directing input text to the different computing resources using the copy of application 410 that uses the updated version of the entity catalog. In this way, entity catalog updates can be performed when updated versions are obtained without disrupting or interrupting the processing of requests at application 410.

Figure 5:
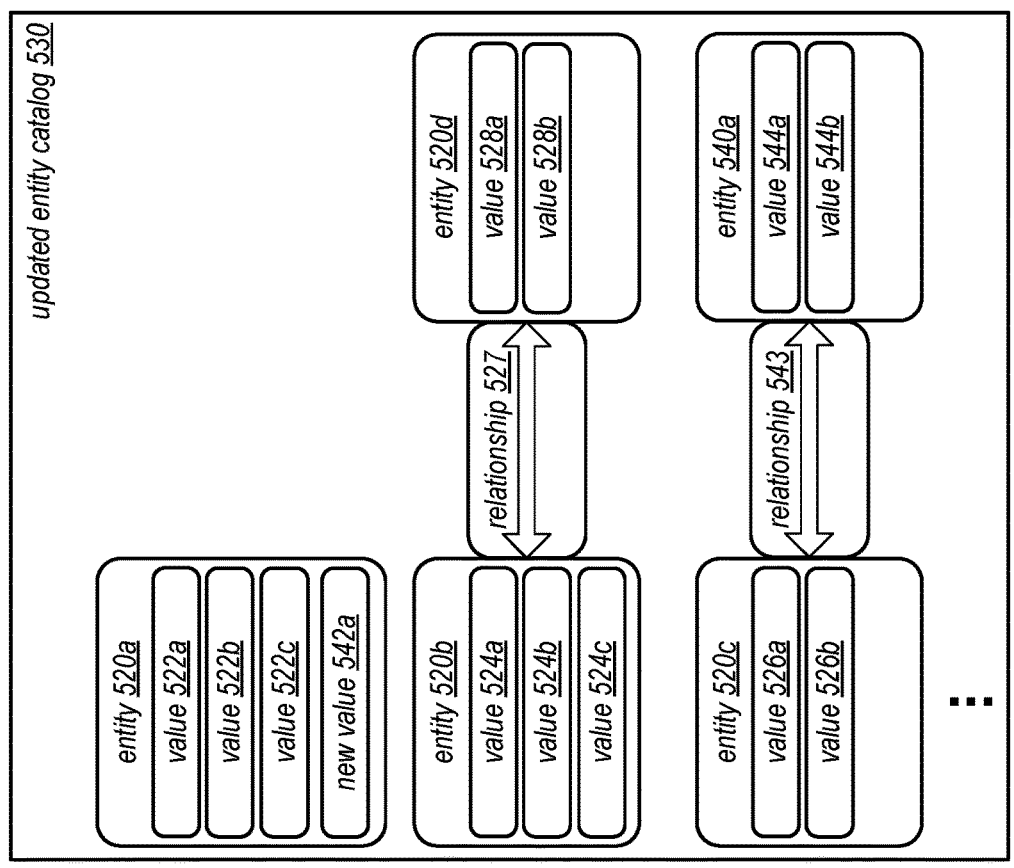
FIG. 5 illustrates a logical block diagram of example versions of an entity catalog, according to some embodiments.
Figure 5:
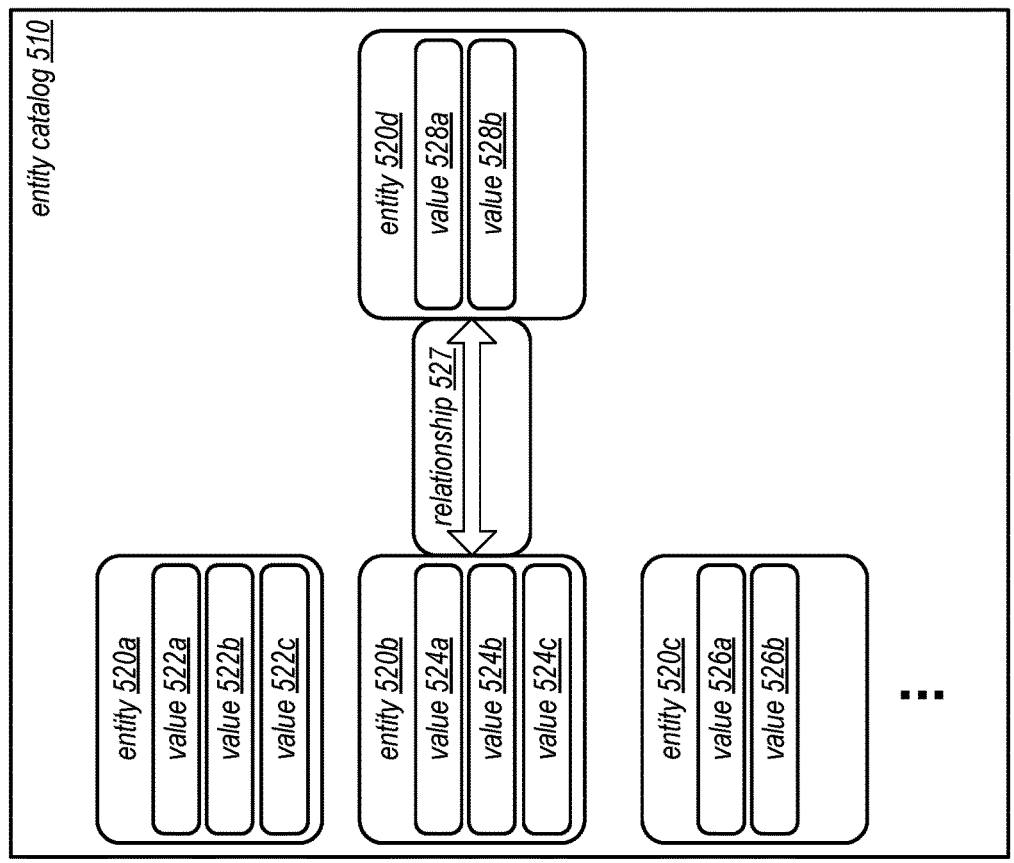

FIG. 5 illustrates a logical block diagram of example versions of an entity catalog, according to some embodiments. As discussed above, an entity catalog may describe the various values of entities that may be used as parameters for different natural language processing tasks. Different changes to an entity catalog may be made, which may in turn change the performance or capabilities of a natural language processing system that uses the entity catalog. For example, entity catalog 510 may include different respective entities, 520a, 520b, 520c, and 520d, which may correspond to different labels, as discussed above. Each entity 520 may have different respective values, such as values 522a, 522b, and 522c, for entity 520a, values 524a, 524b, and 524c, for entity 520b, values 526a and 526b for entity 520c, and values 528a and 528b for entity 520d. An entity catalog 510 may also describe the respective relationships between entities, such as relationship 527. For example, entity 520b may corresponding to a "First name" entity and entity 420d may correspond to a "Last name" entity, where the value of first name also belongs to a certain one of the last name entity values.

As illustrated at 530, an updated entity catalog may include one (or multiple) changes. For example, entity 520a may have a new value 542a added. Similarly, a new entity 540a may be added along with entity values 544a and 544b. A new relationship, such as relationship 543 may also be added, in some embodiments.

Although FIGS. 2-5 have been described and illustrated in the context of a provider network implementing a dialog driven application management service, the various components illustrated and described in FIGS. 2-5 may be easily applied to other systems that implement natural language processing applications. As such, FIGS. 2-5 are not intended to be limiting as to other embodiments of dynamic entity catalog update for natural language processing.

Figure 6:
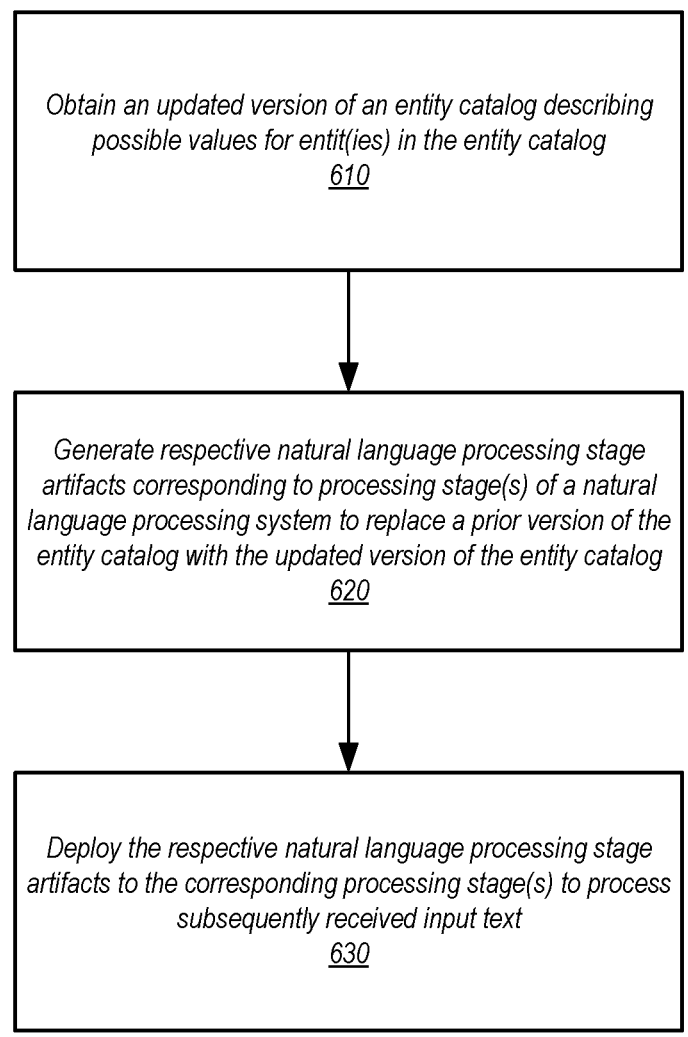
FIG. 6 illustrates a high-level flowchart of various methods and techniques to implement dynamic entity catalog update for natural language processing, according to some embodiments.

FIG. 6 illustrates a high-level flowchart of various methods and techniques to implement dynamic entity catalog update for natural language processing, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, an updated version of an entity catalog describing possible values for one or more entities in the entity catalog may be obtained, in some embodiments. As discussed above with regard to FIG. 5, updated versions of entity catalogs may include changes to entity values (e.g., added or removed) and/or changes in the ontology of entities (e.g., adding or removing entity relationships). In some embodiments, different event triggers for obtaining an updated entity catalog may be used in various embodiments. One event trigger may be the elapse of a period of time since a last check for an update (e.g., trigger check for update every 5 minutes). Another event trigger may be a notification or other indication of a new version of an entity catalog being stored (or written to), from a data store or other source entity catalog data. In some embodiments, a request may be received (e.g., via an API or other interface of a natural language processing system) that indicates a check for an updated version of the entity catalog may be performed. In some embodiments, if no updated version is available when checked-for, the time period (or other event trigger) may be reset in order to automatically check again for the updated version of the entity catalog. In some embodiments, techniques to validate, verify, or otherwise evaluate the updated version of the entity catalog prior to allowing it to be used to update natural language processing stages may be performed (e.g., check for form or other errors in the updated entity catalog). In some embodiments, benchmarking or other analysis could be performed prior to releasing the updated entity catalog into a production system (e.g., before allowing it to be used to dynamically update natural language processing stages in the production system).

As discussed above with regard to FIG. 3, there may be different sources of updated versions of an entity catalog. For example, a data store, whether as part of a same provider network as a service implementing the natural language processing system, a private data store, or a separate, external (e.g., non-provider network) data store, may be used as the storage location of the updated version of the entity catalog. Obtaining the updated version may include accessing such a data store to read, copy, or otherwise get the updated version of the entity data catalog. Another example source may be a web-hook, API, endpoint, or other function invocation to cause the performance of separate program, application, or system to generate (or access) the updated version of the entity catalog. In such embodiments, updated entity data may be returned to the natural language processing system, which in turn may generate the updated version of the entity catalog. Alternatively, the new version of the entity catalog may be provided to the natural language processing system. Another example of a source may be a third party or external system, service, or application, which may be accessed using an API or other interface to obtain the updated version of the entity catalog. For instance, a natural language processing system may request updated entity data according to supported API requests. The use of different sources to obtain an updated version of the entity catalog may be provided or specified via a dynamic update entity catalog configuration request received at the natural language processing system.

As indicated at 620, respective natural language processing stage artifacts corresponding to one or more processing stages of a natural language processing system to replace a prior version of the entity catalog with the updated version of the entity catalog, in some embodiments. For example, different natural language processing systems may have or utilize different processing stages. As discussed above in the example with regard to FIG. 4, an application may include both a slot labeling and a slot resolution stage in order to determine which entity values may be used to label slots identified as part of natural language processing. In some embodiments, a different number of type of processing stages that are based on an entity catalog may be used.

Different types of processing stage artifacts may be generated for different types of processing stages. For instance, a new machine learning model, such as statistic based slot-labeling model, may be trained using the updated version of the entity catalog. In another example, a new search index for slot labels (e.g., a new hash-based index) may be generated using the updated version of the entity catalog. In some embodiments, processing stage artifacts for non-language processing stages, such as for other systems, services, or applications that may utilize the updated entity catalog, such as an automatic speech recognition system may also have new processing artifacts generated.

As indicated at 630, the respective natural language processing stage artifacts may be deployed to the corresponding processing stage(s) to process subsequently received input text, according to some embodiments. For example, the new artifacts may be copied, stored, or provided to computing resource(s) implementing the respective processing stage(s) (or to different computing resource(s). The processing stages may be restarted, using the new artifacts (e.g., loading the new model or new search index). In various embodiments, a natural language processing system may accept and process text input using the artifacts generated from the prior version of the entity catalog while the updated version of the entity catalog is updated and updated natural language processing stage artifacts are generated and deployed. In this way, updates to entity catalogs may be seamlessly and transparently deployed. When deployment is complete, a switch to the generated artifacts for the updated version of the entity catalog may be made (e.g., by redirecting to new computing resources or restarting the processes for the processing stages and then continuing input text processing).

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
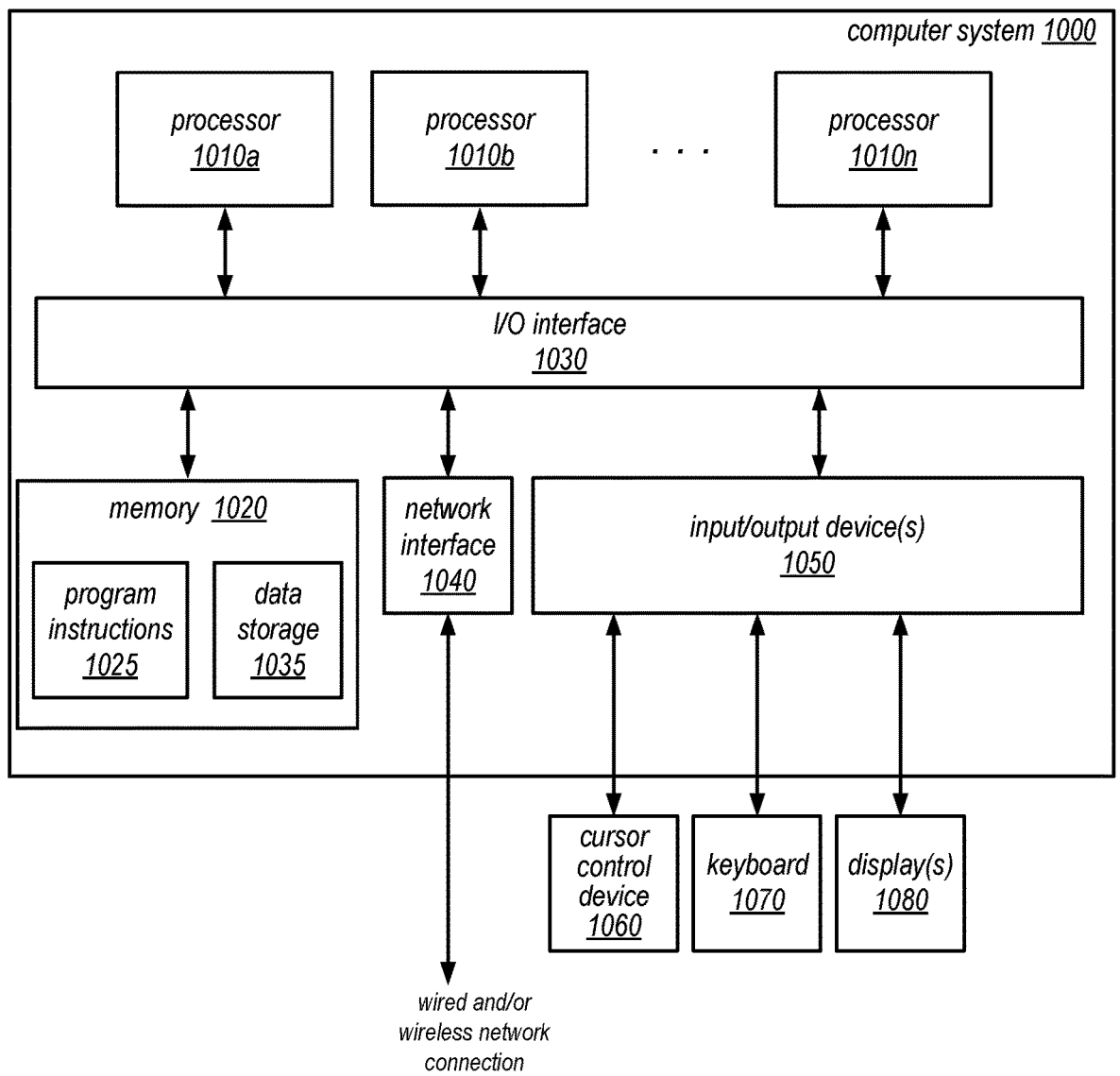
FIG. 7 illustrates an example system to implement the various methods, techniques, and systems described herein, according to some embodiments.

Embodiments of dynamic entity catalog update for natural language processing as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of dynamic entity catalog update for natural language processing, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a natural language processing system, configured to:
   while the natural language processing system is available to process input text based on a first version of an entity catalog describing possible values for one or more entities in the entity catalog:
   obtain a second version of the entity catalog different from the first version of the entity catalog;
   generate different, respective natural language processing stage artifacts of different, respective processing stage types identified for corresponding natural language processing stages of the natural language processing system, wherein the different, respective natural language processing stage artifacts of the different, respective processing stage types are generated using the second version of the entity catalog instead of using the first version of the entity catalog;
   deploy the different, respective respective natural language processing stage artifacts to the corresponding natural language processing stages; and
   after deployment of the different, respective natural language processing stage artifacts to the corresponding natural language processing stages, process an input text through the corresponding natural language processing stages.

2. The system of claim 1, wherein one of the corresponding natural language processing stages is a slot labeling stage, and wherein to generate the respective natural language processing stage artifact corresponding to the slot labeling stage, the natural language processing system is configured to cause training of a new version of a machine learning model for the slot labeling stage based on the second version of the entity catalog.

3. The system of claim 1, wherein one of the corresponding natural language processing stages is a slot resolution stage, and wherein to generate the respective natural language processing stage artifact corresponding to the slot resolution stage, the natural language processing system is configured to generate a new version of a search index for entities in the second version of the entity catalog based on the second version of the entity catalog.

4. The system of claim 1, wherein the natural language processing system is implemented as part of a dialog driven application management service offered by a provider network.

5. A method, comprising:
   obtaining, by a natural language processing system, an updated version of an entity catalog describing possible values for one or more entities in the entity catalog;
   generating, by the natural language processing system, different, respective natural language processing stage artifacts of different, respective processing stage types identified for corresponding processing stages of the natural language processing system, wherein the different, respective natural language processing stage artifacts of the different, respective processing stage types are generated using the updated version of the entity catalog instead of using a prior version of the entity catalog; and
   deploying, by the natural language processing system, the different, respective natural language processing stage artifacts to the corresponding natural language processing stages to process subsequently receive input text, wherein the natural language processing system is available to process input text based on the prior version of the entity catalog until deploying the one or more respective natural language processing stage artifacts to the corresponding natural language processing stages.

6. The method of claim 5, wherein the updated version of the entity catalog adds a relationship between a first entity and a second entity.

7. The method of claim 5, wherein generating the different, respective natural language processing stage artifacts to the corresponding natural language processing stages of the natural language processing system comprises causing a new version of a machine learning model to be trained using the updated version of the entity catalog.

8. The method of claim 5, wherein generating the different, respective natural language processing stage artifacts to the corresponding natural language processing stages of the natural language processing system comprises generating a new version of a search index for entities in the updated version of the entity catalog based on the updated version of the entity catalog.

9. The method of claim 5, further comprising receiving a request that specifies a source for obtaining the updated version of the entity catalog.

10. The method of claim 5, wherein obtaining the updated version of the entity catalog comprises reading the updated version from a data store.

11. The method of claim 5, wherein obtaining the updated version of the entity catalog comprises sending one or more requests formatted according to an interface of a different system, wherein the updated version of the entity catalog is generated based on entity data obtained in one or more responses from the different system.

12. The method of claim 5, wherein obtaining the updated version of the entity catalog comprises sending a request that invokes performance of a function at a network endpoint, wherein the updated version of the entity catalog is returned in a response from the network endpoint or based on entity data obtained in a response from the remote network endpoint.

13. The method of claim 5, wherein the text input and the subsequent text input are received from an automatic speech recognition system that transcribed the text input and the subsequent text input from respective audio data, and wherein the method further comprises generating an automatic speech recognition processing stage artifact to replace the prior version of the entity catalog with the updated version of the entity catalog.

14. One or more non-transitory, computer-readable storage media, storing program instructions that when executed on or across one or more computing devices cause the one or more computing devices to implement:

obtaining an updated version of an entity catalog describing possible values for one or more entities in the entity catalog;

generating different, respective natural language processing stage artifacts of different, respective processing stage types identified for corresponding processing stages of the natural language processing system, wherein the different, respective natural language processing stage artifacts of the different, respective processing stage types are generated using the updated version of the entity catalog instead of using a prior version of the entity catalog; and causing the different, respective natural language processing stage artifacts to be deployed to the corresponding natural language processing stages to process subsequently receive input text, wherein the natural language processing system is available to process input text based on the prior version of the entity catalog until deploying the one or more respective natural language processing stage artifacts to the corresponding one or more natural language processing stages.

15. The one or more non-transitory, computer-readable storage media of claim 14, wherein the updated version of the entity catalog adds a relationship between a first entity and a second entity.

16. The one or more non-transitory, computer-readable storage media of claim 14, wherein, in generating the respective natural language processing stage artifacts to the corresponding natural language processing stages of the natural language processing system, the programming instructions cause the one or more computing devices to implement causing a new version of a machine learning model to be trained using the updated version of the entity catalog.

17. The one or more non-transitory, computer-readable storage media of claim 14, wherein, in generating the respective natural language processing stage artifacts to the corresponding natural language processing stages of the natural language processing system, the programming instructions cause the one or more computing devices to implement generating a new version of a search index for entities in the updated version of the entity catalog based on the updated version of the entity catalog.

18. The one or more non-transitory, computer-readable storage media of claim 14, storing further programming instructions that when executed on or across the one or more computing devices, cause the one or more computing devices to further implement receiving a request that specifies a source for obtaining the updated version of the entity catalog.

19. The one or more non-transitory, computer-readable storage media of claim 18, wherein the obtaining is performed after a trigger event that specifies a period of time elapse before checking for the updated version of the entity catalog.

20. The one or more non-transitory, computer-readable storage media of claim 14, wherein the natural language processing system is implemented as part of a dialog driven application management service offered by a provider network.

* * * * *